Oct. 9, 1934.     R. H. VANSANT     1,976,049
DISPLAY DEVICE
Filed Feb. 13, 1933     4 Sheets-Sheet 1
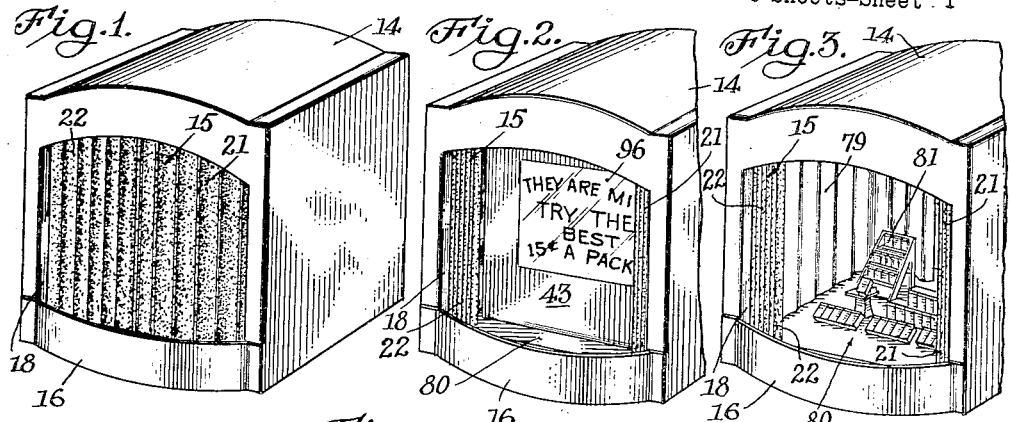
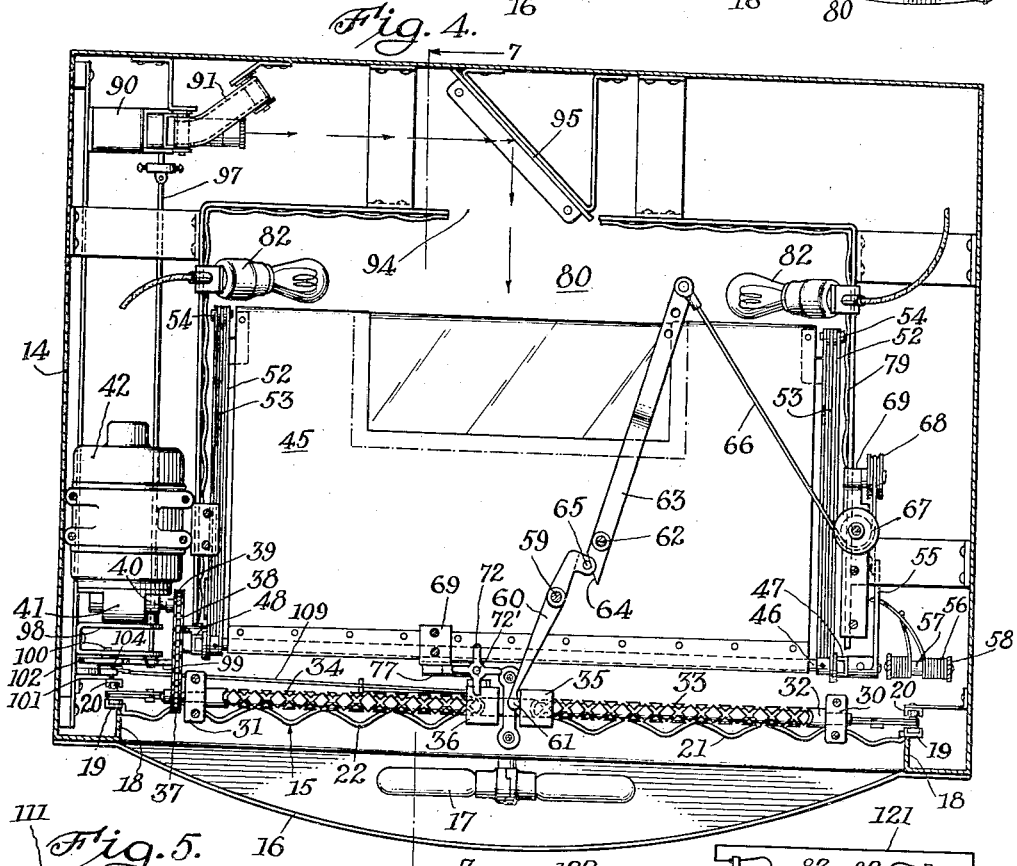
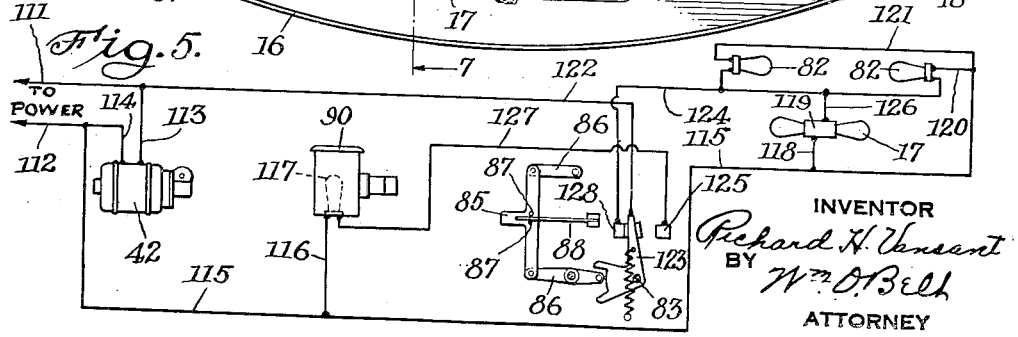
INVENTOR
Richard H. Vansant
BY Wm. O. Bell
ATTORNEY Oct. 9, 1934.   R. H. VANSANT   1,976,049
DISPLAY DEVICE
Filed Feb. 13, 1933   4 Sheets-Sheet 2
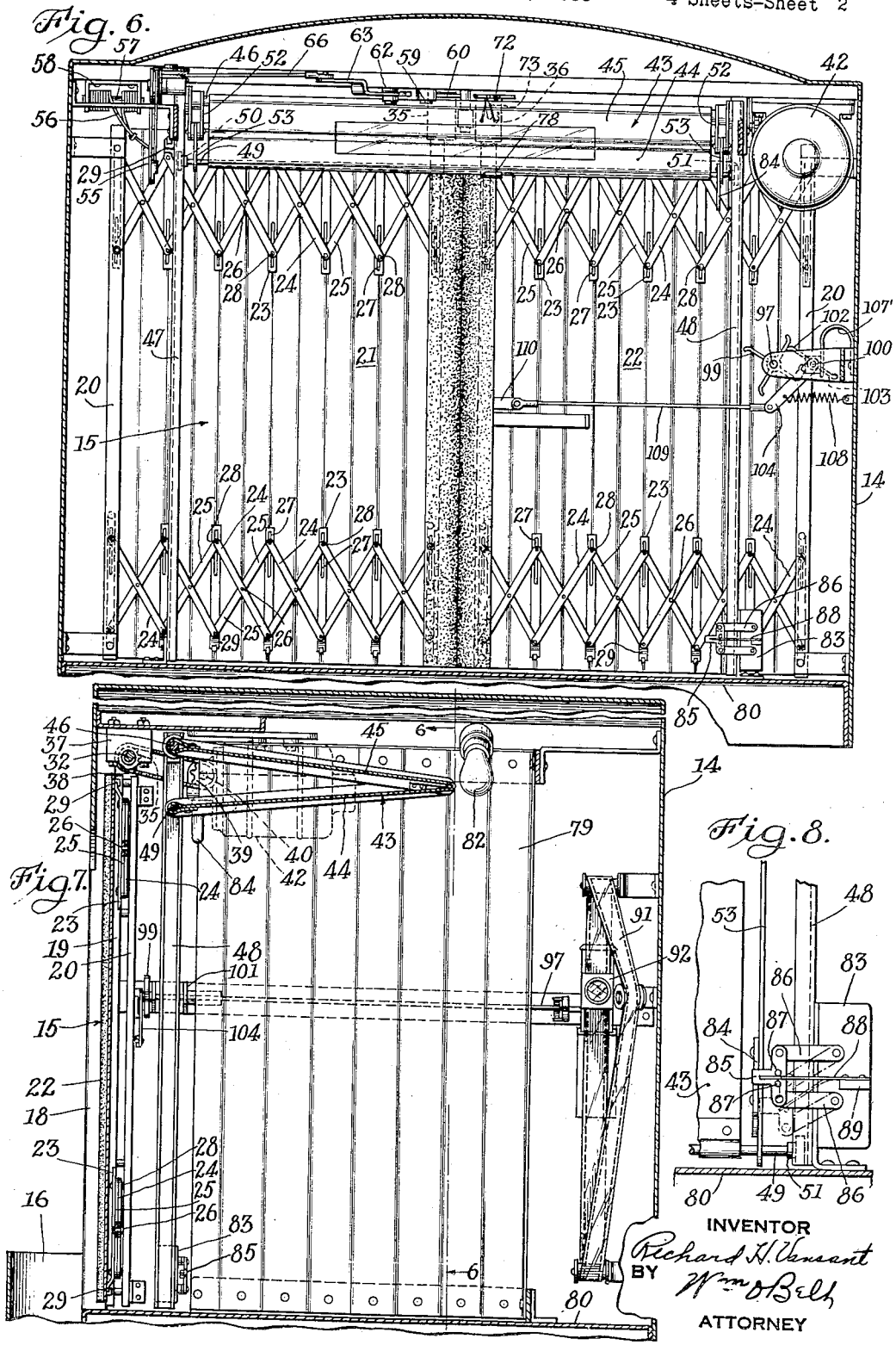

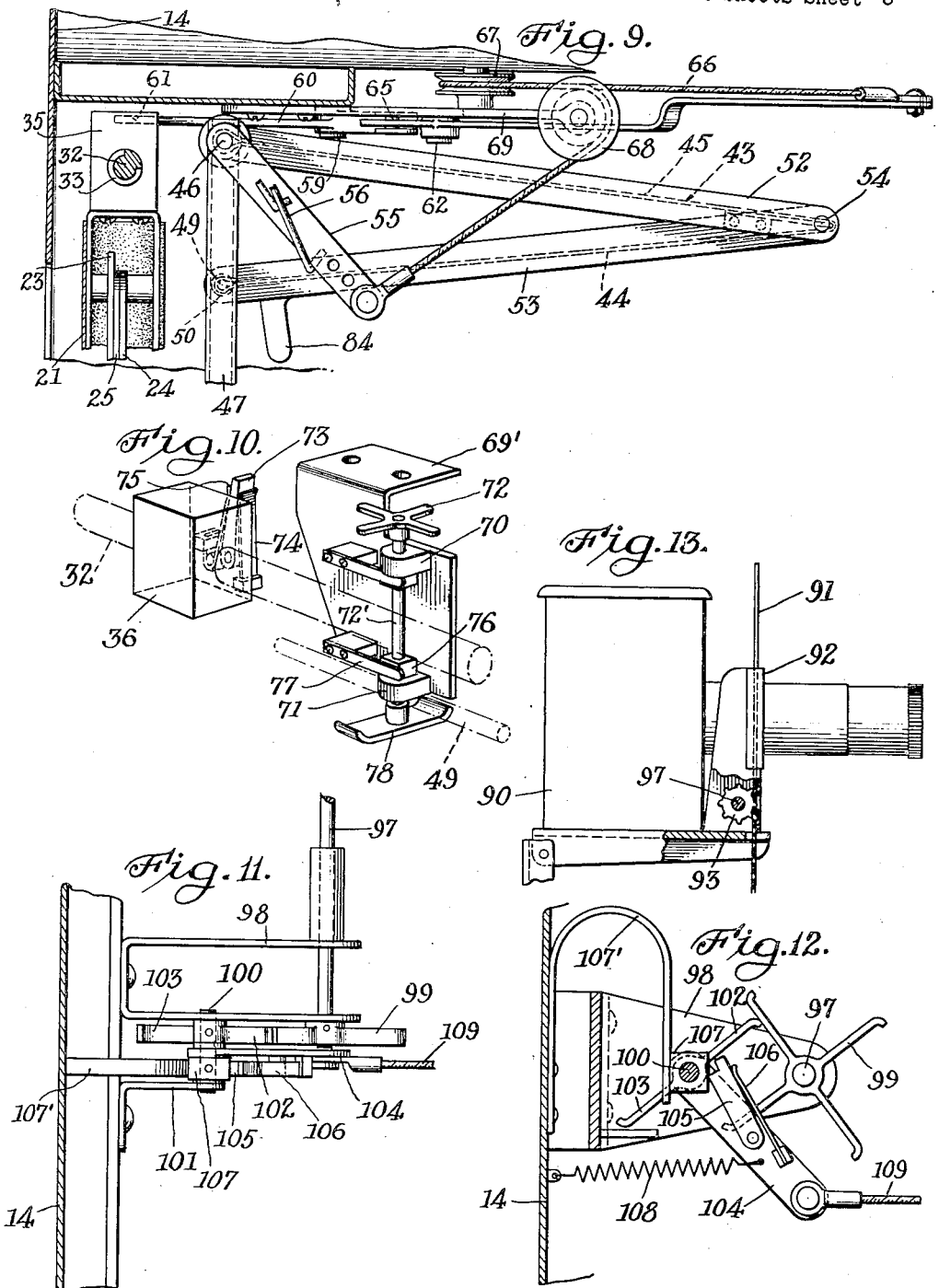

Oct. 9, 1934.    R. H. VANSANT    1,976,049
DISPLAY DEVICE
Filed Feb. 13, 1933    4 Sheets-Sheet 4
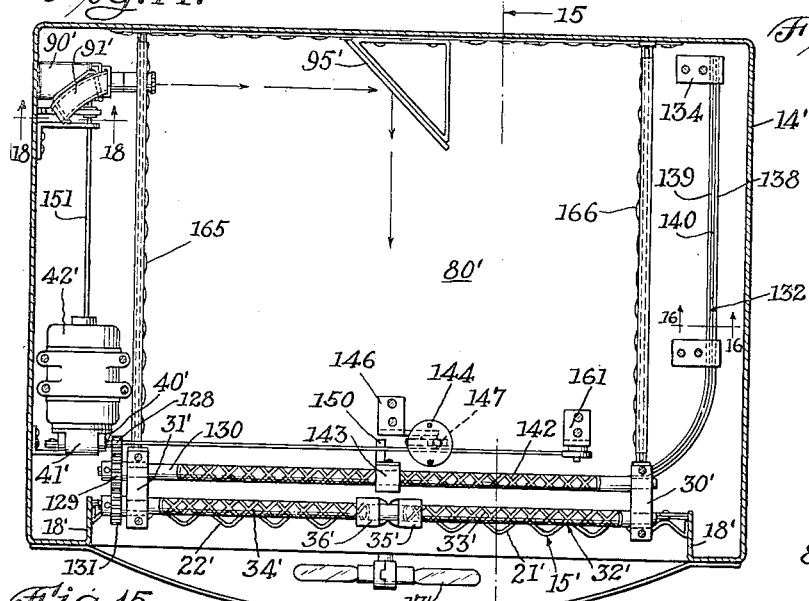
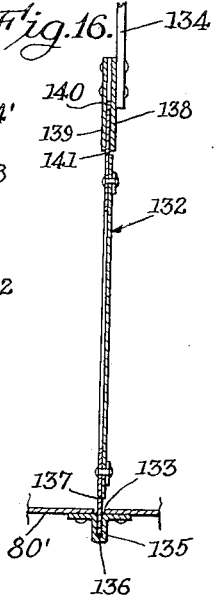
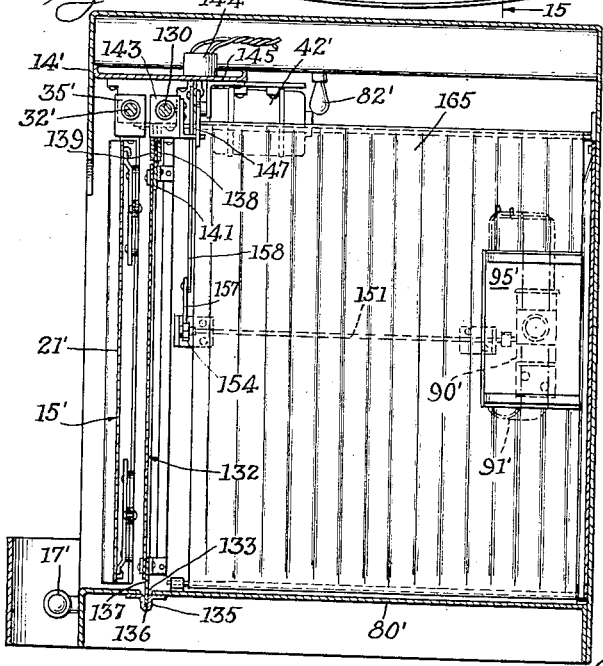
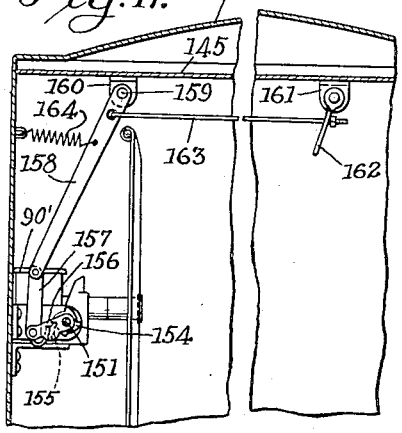
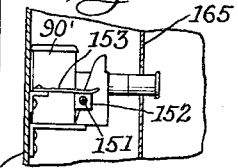
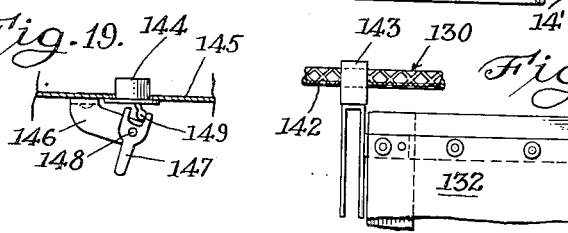
INVENTOR
Richard H. Vansant
BY Wm. O. Belt
ATTORNEY Patented Oct. 9, 1934

1,976,049

UNITED STATES PATENT OFFICE 1,976,049

DISPLAY DEVICE

Richard H. Vansant, Chicago, Ill.

Application February 13, 1933, Serial No. 656,448

32 Claims. (Cl. 40—30)

This invention relates to certain novel improvements in display devices and has for its principal object to provide a display device which will be attractive and novel in appearance so as to arrest the attention of an observer.

Another important object is to provide a display device wherein alternate forms of exhibits may be shown and an ancillary object is to provide a device wherein an exhibit such as a shadow picture or the like will be shown at one time and wherein actual articles of merchandise or the like will be shown at another time.

Another object is to provide a display device wherein alternate forms of exhibits are shown and to conceal the exhibits when the device is operating to effect a change in the exhibit displayed.

Further objects of the invention are to sequentially alter or change an exhibit upon certain operations of the device to display the exhibit, that is to say, where a shadow picture is to be displayed, to successively change the picture upon operations of the device wherein a shadow picture is to be displayed; to control illumination of the device in accordance with the nature of the exhibit being displayed; to move a display member to and from display position in the cycle of operation of the device; to conceal one form of exhibit by the member on which the other form of exhibit is displayed; to provide a curtain or the like for concealing the exhibits during the time a change in the nature of the exhibits is being effected and to smoothly move the curtain to and from closing position; to operate the various parts of the device in definite timed relation in accordance with a predetermined cycle; and to provide a display device simple, compact and economical in construction and efficient and positive in operation.

Selected embodiments of the invention are illustrated in the accompanying drawings wherein Fig. 1 is a perspective view of my novel display device and in which the curtain is shown in closed or concealing position;

Fig. 2 is a perspective view, similar to Fig. 1, showing the curtain in open position to display one form of exhibit;

Fig. 3 is a perspective view, similar to Fig. 2, wherein another form of exhibit is displayed;

Fig. 4 is a horizontal sectional view illustrating one form of my device;

Fig. 5 is a diagrammatic view showing the electrical connections employed in the device;

Fig. 6 is a longitudinal vertical sectional view taken substantially on the line 6—6 on Fig. 7;

Fig. 7 is a transverse vertical sectional view taken substantially on the line 7—7 on Fig. 4;

Fig. 8 is a fragmentary detail view looking toward the front of the machine from the interior thereof and showing a switch and the operating means therefor employed in the form of the device illustrated in Fig. 4;

Fig. 9 is a fragmentary vertical sectional view showing the parts mounted at the right hand side of the device as viewed in Fig. 4;

Fig. 10 is a perspective detail view illustrating a locking device and the operating means therefor provided at the front end of the device as illustrated in Fig. 4;

Fig. 11 is a fragmentary detail view of an advancing means mounted at the left hand side of the device as viewed in Fig. 4;

Fig. 12 is a fragmentary side view of the parts illustrated in Fig. 11;

Fig. 13 is a detail view of one form of the projecting means mounted at the left hand side of the device as viewed in Fig. 4;

Fig. 14 is a view similar to Fig. 4 showing a modified form of construction;

Fig. 15 is a transverse sectional view taken substantially on the line 15—15 on Fig. 14;

Fig. 16 is a detail sectional view taken substantially on the line 16—16 on Fig. 14;

Fig. 17 is a detail view illustrating an operating mechanism mounted at the front of the device as shown in Fig. 14;

Fig. 18 is a detail view taken substantially on the line 18—18 on Fig. 14; and

Figs. 19 and 20 are detail views of parts mounted at the front end of the device as illustrated in Fig. 14.

In the accompanying drawings and referring more particularly to Figs. 1 to 13, 14 generally indicates the housing of my novel display device, the front end of which is preferably arranged to similate a theater stage or the like. A curtain 15, to be described more fully hereinafter, is provided at the open front end of the housing 14 and is movable to and from closing position so as to alternately conceal and reveal exhibits arranged in the housing 14 inwardly of the curtain 15. A band 16 or the like is provided at the bottom of the housing 14 and at the front thereof and is arranged outwardly of the curtain 15 and defines a space in which lamps 17 may be mounted, these lamps simulating the foot lights customarily associated with a stage.

Frame members or flanges 18 are provided at each side of an opening at the front of the housing 14 and secured to the inner ends of the flanges are strips 19. Strips 20 are respectively spaced from and cooperate with the strips 19 and the respective pairs of strips provide a support for the ends of the curtain 15. The curtain 15 consists of an accordion pleated fabric or the like and is divided into two sections 21 and 22 which are movable in a vertical plane and the adjacent edges of the sections are adapted to engage each other at the center of the opening at the front of the housing 14. The sections 21 and 22 are supported at the upper and lower edges thereof by a system of cross levers providing what is in effect a lazy tong movement. The lower ends of plates 23 are secured adjacent the lower ends of the inwardly disposed ridges of the accordion pleated section 21 of the curtain 15. Sets of levers 24 and 25 are crossed medially in the extent thereof and are pivotally interconnected as indicated at 26 at the point where they are crossed. Slots 27 are provided in the upper ends of these plates 23. The ends of the lever 24 in one set are disposed above the ends of the levers 25 in the adjacent sets. The upper ends of the levers 24 and 25 of an adjacent set of levers are interconnected at 28 and the pin or the like providing this interconnection is arranged in the slot 27 in the plate 23 immediately below this interconnection 28. The lower end of the lever 24, pivotally interconnected at 28 to the lever 25 of one of the adjacent sets of levers, is pivotally interconnected at 29 to the lower end of the lever 25 of the other set of levers adjacent the one of which this lever 24 is part. This pivotal interconnection 29 also pivotally connects the levers to the adjacent plate 23. The connection 28 is free to move through the slot 27 and this permits the levers to be pivoted about the interconnections 26 so that the angular relationship between the levers may be changed. When the angular relation between the levers of the various sets is increased, the system of levers is extended and conversely when the angular relationship is decreased, the system of levers is collapsed. A lazy tong movement similar to this is provided at the bottom of the section 22. Similar lazy tong movements are provided at the top of the sections 21 and 22 but here the slots are provided in the lower ends of the plates and it is the upper ends of the plates that are connected to the sections adjacent the upper ends thereof. These lazy tong movements serve to support the curtains and prevent sagging thereof. The free ends of the levers of the outermost sets of levers of the lazy tong movements are connected to the plates 19 adjacent thereto in the same manner as that in which they are connected to the plates 23. Substantially U-shaped frames are provided at the inner ends of the sections 21 and 22. The free ends of the levers of the inwardmost sets of levers of the lazy tong movements are connected to one leg of the U-shaped frames in the same manner as that in which they are connected to the plates 23. These interconnections of the end levers of the lazy tong movements insure proper support of the curtain sections and smooth movement thereof; this movement of the curtain sections which is to and from closing position is effected in the following manner.

Bearings 30 and 31 are supported at the top of the housing 14 and a shaft 32 is journaled therein. Two endless reversing screws 33 and 34 are formed on this shaft above the sections 21 and 22 of the curtain 15. Nuts 35 and 36 respectively cooperate with endless screws 33 and 34 so that when the shaft 32 is rotated the nuts 35 and 36 are reciprocated along the shaft. The nuts 35 and 36 are respectively connected to the U-shaped frame members at the inner ends of the curtain sections 21 and 22. A sprocket 37 is secured on the shaft 32 outwardly of the bearing 31 and an endless chain 38 is directed about this sprocket 37. A sprocket 39 is fast on the shaft 40 of the speed reduction unit 41 directly connected to the shaft of the motor 42 suitably supported within the housing 14. Hence, when the motor is set in operation the shaft 32 is rotated and inasmuch as the nuts 35 and 36 are similarly positioned on the endless screws 33 and 34, it is clear that the curtain sections 21 and 22 similarly move in timed relation to and from open position and since the motor 42 runs continuously in the operation of the device, the curtain sections 21 and 22 constantly move to and from open and closed positions.

As has been explained, it is desirable in devices of this character to alternately display different forms of the exhibits and to this end I have arranged the device so that a shadow picture or actual articles of merchandise or the like may be alternately displayed. To this end I provide a screen, generally indicated by 43, and I mount this screen immediately behind the curtain 15. The screen comprises two sections 44 and 45 which, as best illustrated in Fig. 7, may be folded toward each other near the top of the housing 14. The free end of the section 45 of the screen 43 is pivotally connected on a rod 46 mounted at the upper ends of grooved guides 47 and 48. A rod 49 is provided at the free end of the section 44 of the screen 43, and this rod has rollers 50 and 51 at the free ends thereof respectively mounted in the grooved guides 47 and 48 and as the screen 43 moves to and from display position these rollers travel through the guides. A lever, such as 52, is provided at each end of the screen section 45 and corresponding ends of these levers are fast on the rod 46. Levers, such as 53, are provided at each end of the screen section 44 and corresponding ends of these levers are pivotally connected to the rod 49. The free ends of the levers 52 and 53 are pivotally interconnected at 54 in alignment with the juncture of the sections 44 and 45 of the screen 43. An arm 55 is fast to the rod 46 outwardly of the frame member 47 and a coiled spring 56 (Fig. 4) carried by a shaft 57 mounted in a bracket 58 supported by the top of the housing 14 acts on the arm 55 to normally urge the arm into the position illustrated in Fig. 9. Thus, the spring acts through the rod 46 and levers 52 and 53 to hold the screen 43 in its upper or non-display position illustrated in Fig. 9.

Suitable means are provided to move the screen 43 to and from display position and this means is controlled by the nut 35. A stud 59 is supported at the top of the housing 14 and a lever 60 is mounted thereon. The lever 60 includes a head 61 adapted to be engaged by the nut 35 at the time this nut is located at or near to the inner end of the screw 33. Another stud 62 is provided at the top of the housing 14. A lever 63 is pivotally mounted on the stud 62 and this lever includes a tapered end 64 engaged with a pin 65 on the lever 60. One end of a cable 66 is connected to the end of the lever 63 opposite the tapered end 64 thereof and this cable is directed about a guide pulley 67 and supported at the top of the housing 14 and also about the guide pulley 68 mounted on the arm 69 (Fig. 9) carried by the housing 14 and the free end of this cable is connected to the free end of the arm 55.

A retaining device, to be described more fully hereinafter, normally holds the screen in the position illustrated in Fig. 3 but when this retaining device is retracted and the nut 35 moves toward the right, as viewed in Fig. 4, the rollers 50 and 51 move downwardly through the grooved guides 47 and 48 until the sections 44 and 45 of the screen 43 are in vertical alignment and when these sections attain this position the screen is arranged behind the curtain 15 so that when the curtain is retracted the screen will be displayed, and this screen serves to conceal any merchandise or the like arranged within the housing 14 inwardly of the screen, as will be explained. The screen attains this position as soon as the nut 35 has moved toward the right sufficiently to permit the lever 60 to extend at an angle to the sides of the housing 14 opposite to the angle in which said lever is shown as extending in Fig. 4 and consequently the screen is in display position almost as soon as the curtain sections start to move outwardly. When the screen is arranged in the vertical position and a shadow picture or the like is projected thereon, as will be explained, the screen remains in this position until the nut 35, during its movement toward the left, as viewed in Fig. 4, engages the lever 60 and moves the lever into the position illustrated in Fig. 4. As the lever moves into this position the pin 65 moves along the tapered end 64 of the lever 63 and pivots the lever. The lever 63 is fulcrumed adjacent the tapered end 64 thereof so that an appreciable portion of the extent thereof is on the leg opposite the leg on which the tapered end 64 is formed. Therefore, slight movement of the tapered end 64 imparts appreciable movement to the other end of the lever 63, and this movement is transmitted through the cable 66 to the arm 55. At the time the screen moves into the vertical position described, the arm 55 moves into a position on the opposite side of the guide 47 from that in which it is shown in Fig. 9 and when the nut 35 engages the lever 60 in its movement toward the lever to move the lever 63, the cable 66 is moved and draws the arm 55 into the position shown in Fig. 9 which raises the screen into the position illustrated in Fig. 9, and it is clear that this upward movement of the screen occurs at a time when the inner ends of the curtain sections are close together. It is therefore apparent that the movement of the screen to and from display position is concealed for all practical purposes.

It has been stated that a retaining device is provided to hold the screen in position shown in Fig. 9, and this retaining device is illustrated in detail in Fig. 10. The retaining device includes a bracket 69' supported at the top of the housing 14 and providing bearings 70 and 71 for the vertical shaft 72'. At the upper end of this shaft 72' is a four-armed star wheel 72. Pivotally mounted on the nut 36 is a pawl 73, the opposite sides of which are engaged by leaf springs 74 and 75 which serve to hold the pawl in upright position. When the nut 36 moves toward the right and to its inner position, as shown in Fig. 4, the pawl 73 engages an arm of the star wheel 72 and imparts a quarter turn to the shaft 72'. In order to insure uniform ninety degree movement of the shaft 72', square blocks 76 are mounted inwardly of the bearings 70 and 71. Leaf springs 77 carried by the bracket 69' bear flatly against the outwardly disposed faces of the blocks 76 and hence each time the pawl 73 engages the star wheel 72 sufficiently to move corners of the blocks over center relative to the springs 77, the shaft 72' will be turned ninety degrees. At the lower end of the shaft 72' is a retaining device 78 which includes upwardly turned end portions. The retaining device 78 is in the nature of a strip and it is connected to the shaft 72' so as to extend parallel with two opposite faces of the blocks 76.

An enclosure 79 is provided in the housing 14 inwardly of the position into which the screen 43 moves when it is in display position, and this enclosure cooperates with the floor 80 in the housing 14 to provide a space behind the curtain 43 in which articles of merchandise 81 or other physical displays may be arranged. When the screen 43 is in the position illustrated in Fig. 9 and the curtain sections 21 and 22 are retracted, the space enclosed by the enclosure 79 is open to view as will be the articles 81 arranged on the floor 80. Lamps 82 positioned on opposite sides of the enclosure near the top thereof are, together with the lamps 17, adapted to be lit when the merchandise 81 is being displayed.

In order to permit a shadow picture to be projected onto the screen 43 it is essential that the lamps 17 and 82 be extinguished when the screen 43 is in its lower position. To this end an over-center double-pole switch, generally indicated by 83, is mounted in the housing 14 at the lower end of the guide 48. A lug 84 is mounted on the lever 53 adjacent the guide 48 and when the screen 43 is in its vertical position, this lug 84 will have engaged and moved the arm 85 from the full-line position thereof, shown in Fig. 8, into the dotted-line position which, as will be explained, opens the circuit to the lamps 17 and 82. The arm 85 is carried by the operating levers 86 of the switch 83 and has spaced pins 87 thereon. A leaf spring 88 carried by the block 89 on the housing of the switch 83 is disposed between the pins 87 and this leaf spring holds the levers 86 and the arm 85 in the full-line position of Fig. 8 at all times except when the arm 85 is engaged by the lug 84.

As has been stated, it is desirable to project a shadow picture or the like on the screen 43 when it is in vertical position and to this end a projector 90 is provided which may either be, for example, a motion picture projector or a stereopticon projector and this latter type is illustrated. An endless film 91 is extended between the illuminating means and the lens of the projector 90 through a guide 92 (Fig. 13). In the guide 92 is a toothed wheel 93 which engages the apertures in the edges of the film and moves successive pictures on the film into alignment with the lens of the projector so that the picture may be projected onto the screen 43. In order to conserve space, the projector 90 is preferably mounted at a rear corner of the housing 14. An opening 94 is provided in the rear wall of the enclosure 79 and a reflector 95, in the nature of a mirror or the like, is arranged behind this opening 94, preferably at a forty-five degree angle relative to the screen 43 and the line of projection from the projector 90. Hence, a picture or the like may be projected onto the mirror which reflects this picture onto the rear of the screen 43, such a picture being indicated by 96 in Fig. 2.

In order to advance the film 91 in a step-by-step manner, the toothed wheel 93 is mounted on a shaft 97 which is carried by a bracket 98 (Figs. 11 and 12) supported from the housing 14. Fixed on the shaft 97 adjacent the bracket 98 is a four-arm star wheel 99. A shaft 100 is journaled in the bracket 98 and another bracket 101. Arms 102 and 103 extend from the shaft 100 in opposite directions and include foot portions adapted to successively engage the arms of the star wheel 99, as will be explained. Movement is imparted to the shaft 100 from an arm 104, one end of which is pivotally mounted on the shaft 100. A pawl 105 is mounted on the arm 104 and is acted on by a spring 106 to be urged toward the square block 107 which constitutes a ratchet. One limb of a U-shaped spring 107' engages a face of the block 107 and the pawl 105 only imparts sufficient movement to the block 107 to move it past center for as soon as the block is moved past center the spring 107' completes the ninety degree movement to be imparted to this block and the shaft 100. A spring 108 extends between a spring anchor on the housing 14 and the arm 104 and urges the arm toward the housing. One end of a cable 109 is connected to the free end of the arm 104 and the opposite end of this cable is connected to a lug 110 secured to the U-shaped frame at the inner end of the section 22 of the curtain 15.

Current is supplied from line wires 111 and 112 to the motor 42 through conductors 113 and 114. A conductor 115 is connected to the line wire 112 and a conductor 116 extends between one terminal of the lamp 117 in the projector 90 and the conductor 115. A conductor 118 interconnects one terminal of the double socket 119 for the curtain lamps 117 with the conductor 115. A conductor 120 interconnects one terminal of one of the lamps 82 with the conductor 115 and a conductor 121 interconnects one terminal of the other lamp 82 with the conductor 115. A conductor 122 interconnects the line wire 111 with the movable contact 123 of the switch 83. A conductor 124 is connected to the terminal 128 of the switch 83 and to the other terminals of the lamps 82. A conductor 126 interconnects the conductor 124 with the other terminal of the socket 119. A conductor 127 interconnects the contact 125 of the switch 83 with the other terminal of the lamp 117.

The operation of the device is as follows: At the start of the operation with the parts arranged in the manner illustrated, the curtain sections 21 and 22 are in closing position, as shown in Fig. 1, and the screen 43 is in the upper position illustrated in Fig. 9. When a circuit is closed to the motor 42, the shaft 32 is so rotated that the nuts 35 and 36 are caused to move outwardly away from each other. Since the inner ends of the screen sections are connected to these nuts, it is clear that these sections will start to move outwardly. When the nut 35 moves outwardly, the lever 60 pivots toward the right, as viewed in Fig. 4, whereupon the curtain 43 moves into the vertical position previously described. When the rod 49 attains its lowermost position, the lug 84 will have engaged the arm 85 and so moved the levers 86 that the movable contact 123 of the switch 84 will have moved into the position illustrated in Fig. 5, whereupon circuit is closed to the lamp 117 of the projector 90. Since the screen will already be in its vertical position, the projector 90 will throw an image upon the mirror 95 and this image or picture will be projected onto the screen 43 and at this time the curtains will be in open position, as illustrated in Fig. 2. However, immediately following the movement of the curtain sections 21 and 22 into their outermost position, the nuts 35 and 36 start to move inwardly toward each other thereby moving the curtains inwardly. As soon as the nut 35 approaches its inner position it engages the lever 60 and movement is imparted to this lever 60 to raise the curtain 43 and as soon as the rod 49 starts to move upwardly, the lug 84 is withdrawn from engagement with the arm 85 whereupon the over-center device in the switch 83 moves the movable contact 123 from engagement with the contact 128 into engagement with the contact 125 whereupon the lamp in the projector 90 is extinguished and circuit is closed to the lamps 17 and 82. Immediately following the closing of the circuit to the lamps 17 and 82, the curtains close and since the nuts 35 and 36 will have attained the inner end of their movement, they will start to move outwardly. Movement of the nut 36 into its inner position causes the pawl 73 to engage an arm of the star wheel 72, and this movement causes the shaft 72' to be turned whereby the retaining device 78 is moved into position below the rod 49 to thereby secure the screen 43 in its upper position. As the nuts 35 and 36 move outwardly at this time, the merchandise 81 or the like will be disclosed since the lamps 17 and 82 are operating and the screen 43 is elevated. The nuts 35 and 36 continue their outward movement and consequently the curtain sections 21 and 22 continue to open and as soon as the curtain sections attain their outermost position, the nuts 35 and 36 start to move inwardly thereby moving the curtains toward closing position. Since the retaining device 78 is positioned below the rod 49, the curtain 43 does not lower notwithstanding the movement of the nut 35 away from the lever 60. However, when the nut 36 attains its inner position, the pawl 73 engages an arm of the star wheel 72 and so turns the shaft 72' that the retaining device 78 is moved from position below the rod 49. At this time, however, the nut 35 is engaging the lever 60 and consequently the screen cannot lower and since the rod 49 remains in the upper position, the lamps 17 and 82 continue to operate. However, when the nuts 35 and 36 again start to move outwardly, the lever 60 tends to follow the nut 35 since it will now be supporting the screen 43 and since the retaining device 78 is retracted the screen 43 will lower.

At the time the screen 43 is locked in its uppermost position and the lamps 82 and 17 are operating and the curtain sections 21 and 22 move outwardly, the lug 110 starts to move inwardly and as this lug moves inwardly the spring 108 so moves the arm 104 that the pawl 105 moves into position to engage one side of the block 107 and as the curtains start to move inwardly, the cable 109 moves the arm 104 and the pawl 105 turns the block 107 so that the spring 107' can turn the block through a ninety degree movement. When this movement occurs, the arm 103 engages an arm of the star wheel 99 and imparts a ninety degree movement to the shaft 97 which, in turn, imparts movement to the toothed wheel 93 and a new picture on the film 91 moves into position to be projected. After the curtains attain their inner position and again start to move outwardly, the spring 108 again moves the arm 104 so that the pawl 105 can engage the next face of the block 107 and when the curtains start their next inward movement, the cable 109 again causes the pawl to move the block 107 so that the spring 107' again imparts a ninety degree movement to the shaft 100. However, at this time the arm 102 or 103 will move from engagement with an arm of the star wheel but since the arms of the star wheel are spaced at ninety degree intervals whereas the arms 102 and 103 are spaced in a one hundred and eighty degree interval, no movement is imparted to the shaft 97. From this it is clear that the film is advanced only upon alternate opening and closing movements of the screen sections 21 and 22.

In the form of the invention shown in Figs. 14 to 20, inclusive, 14' generally indicates the housing which is constructed similarly to the housing 14. A curtain 15', substantially similar to the curtain 15, is provided at the open front end of the housing 14' and is movable to and from closing position to alternately conceal and reveal exhibits in the housing inwardly of the curtain. Lamps 17' provide foot lights for the stage-like display housing. Flanges 18' are provided at each side of the opening at the front of the housing. The curtain 15 consists of an accordion pleated fabric or the like and is divided into two sections 21' and 22' which, like the sections 21 and 22, are movable in a vertical plane and the adjacent edges thereof are adapted to engage each other at the center of the opening at the front of the housing. Lazy tong devices, substantially similar to those described, are provided near the top and bottom edges of the curtain sections to guide and support the same during movement to and from closing position. Bearings 30' and 31' are supported at the top of the housing 14 and a shaft 32' is journaled therein which, like the shaft 32, has two endless reversing screws 33' and 34' therein. Nuts 35' and 36' cooperate with the endless screws so that when the shaft 32 is rotated these nuts are reciprocated along the shaft. The nuts are respectively connected to frame members in the inner ends of the curtain sections. A motor 42' is mounted in the housing and a speed reducer 41' is directly connected thereto and includes a shaft 40'. A gear 128 is mounted on the shaft 40' and meshes with a gear 129 fast on the shaft 130 journaled in the bearings 30' and 31' in juxtaposition to the shaft 32'. The gear 129 meshes with a gear 131 fast on the shaft 32'. The motor 42' is constantly operated during operation of the device and therefore the shaft 32' is constantly rotated which causes the nuts 35' and 36' to continuously reciprocate on the shaft 32'. Since the nuts are connected to the curtain sections, it is clear that these sections are constantly in motion to and from closing position.

In this embodiment of the invention it is also desirable to alternately display actual merchandise or the like and shadow pictures or the like. In order to display the shadow pictures I provide a screen, generally indicated by 132. This screen consists of a substantially rectangulalr frame provided by flat strips preferably made of resilient material such as spring steel. A slot 133 is provided in the floor 80' of the housing 14' and a bracket 135 is mounted below this slot, and a groove 136 is provided in this bracket in alignment with the slot. The lower strip 137 of the frame of the screen 132 extends through the slot 133 into the groove 136 and rides therein. Two spaced apart plates 138 and 139 providing a groove 140 therebetween are supported at the top of the housing 14' by brackets 134, and the groove 140 is aligned with the groove 133. The top strip 141 of the frame of the screen 132 is disposed in the groove 140 and rides therein. The slot 133 and the groove 140 are arranged to extend across the front of the housing in vertical alignment with the shaft 130, and this groove and slot extend along the right hand side of the housing, as viewed in Fig. 14, and the portions of the slot and groove at the front of the housing are connected with the portions of the slot and groove at the side of the housing by suitably curved portions clearly illustrated in Fig. 14.

An endless reversing screw 142 is formed in the shaft 130 and the nut 143 cooperates therewith to be reciprocable along the shaft 130 when said shaft is rotated. The nut 143 is connected to one side edge of the screen 132, as shown in Fig. 20. The length of the reversing screw 142 is equal to the aggregate length of the reversing screws 33' and 34'. The gears 129 and 130 have a one-to-one ratio and therefore the shafts 32' and 130 rotate in synchronism. Assuming the parts to be in the position illustrated in Fig. 14, one edge of the screen 132 is aligned with the inner edge of the curtain section 21'. With the parts in this position the shafts 32' and 130 may be set in operation whereupon the nuts 35' and 36' will move outwardly along the reversing screws 33' and 34'. At this same time the nut 143 will move along the screw 142, toward the right as viewed in Fig. 14, and as the screw 142 has a lead similar to the lead of the screws 33' and 34', the nut 143 will move in synchronism with the nuts 35' and 36' and therefore the edge of the screen 132 will remain in alignment with the inner edge of the curtain section 21'. When the curtain moves in this manner the top and bottom edges of the frame thereof move through the grooves 140 and 136 and hence that portion of the screen which has been extended across the front of the housing behind the curtain is moved into the portions of the grooves at the right hand side of the housing and the curtain moves between this position at the side and the position at the front alternately, as will be described. When the nuts 35' and 36' and the nut 143 reach the outer ends of the screws with which they cooperate, the curtain will be in disclosing position and the screen will be entirely retracted. However, when the nuts start to move inwardly along the screws with which they cooperate, the curtain sections are returned to closing position and here again the adjacent edge of the screen 132 moves in parallel relation with the inner edge of the screen section 21'. At the time the nuts 35' and 36' reach the inner ends of the screws 33' and 34', the nut 143 will be midway between the ends of the screw 142. At this time, in a manner to be described, the lights are extinguished in the housing 14' as are the foot lights 17' and, in a manner to be described, means are operated to project a shadow picture onto the screen 132, and space intermediate the frame members being covered by a suitable translucent material, such as silk, vellum, parchment paper or the like and since this material is translucent a picture projected thereonto from the rear thereof may be viewed at the front of the housing. As the shaft 32' and the shaft 142 continue to rotate the nuts 35' and 36' move outwardly along the screws with which they cooperate and the nut 143 continues to move along the screw 142 in timed relation with the movement of the nuts 35' and 36' and at this time the adjacent edge of the curtain 132 moves in parallel relation with the inner edge of the screen section 22'. Since the edge of the screen moves in parallel relation with the edges of the curtain, movement of the screen to and from display position is concealed. The parallel relation between the edges of the screen and the curtain section 22' is maintained until the edges of the curtain sections reengage at the center of the opening whereupon the above described operation is repeated.

In this embodiment of the invention the lights illuminating an exhibit arranged on the floor 80' and the projector are controlled by the movement of the screen and the advancing of the film passed through the projector is also controlled by movement of the screen. A suitable switch 144 (Figs. 14 and 19) is mounted in the top wall 145 of the housing 14', and this switch operates substantially similarly to the switch illustrated in Fig. 5, identical electrical connections being employed in the two illustrated embodiments of the invention. A bracket 146 depends from the wall 145 and a trip dog 147 is pivotally mounted thereon at 148 and the trip dog includes a bifurcated upper end which engages the operating arm 149 of the switch 144. As best shown in Fig. 14, the switch 144 is mounted substantially midway in the extent of the screw 142. An arm 150 is provided on the nut 143 and when the nut 143 starts to move toward the right as viewed in Fig. 14 and from the position illustrated in Fig. 14, the arm 150 engages the dog 147 and trips the switch 144 so that the projector is rendered inoperative and the lamps 17' and lamps 82', similar to the lamps 82, are rendered operative so as to illuminate a display of merchandise or the like arranged on the floor 80' of the housing 14'. After the arm 150 has moved past the dog 147 and the nut 143 attains the end of its movement toward the right and during its movement toward the left, the arm again engages the dog 147 and again trips the switch 144 at which time the lamps 17' and 82' are rendered inoperative and the projector is rendered operative.

The projector 90' is mounted in the housing 14' substantially similarly to the manner in which the projector 90 is mounted in the housing 14'. A mirror 95' is mounted in the housing 14' similarly to the manner in which the mirror 95 is mounted in the housing 14 and the projector 90' throws a picture onto the mirror 95' which reflects it onto the screen 132, as indicated by the arrowed lines in Fig. 14. A film 91' is directed about suitable guides and is passed through the projector 90', and this film is engaged by a toothed wheel (not shown) substantially similar to the wheel 93. The wheel similar to the wheel 93 is fast on a shaft 151 mounted at the left hand side of the housing, as viewed in Fig. 14. A square block 152 is mounted on the shaft 151 and a leaf spring 153 bears against the flat sides of this block so that when the shaft 151 is turned to move a corner of the block 152 over center relative to the spring 153, a ninety degree movement is imparted to the shaft 151 by the spring, and when the shaft is so moved the successive pictures on the film 91 are sequentially moved into the projector 90'. In order to move the shaft 151 in the manner described, I provide a ratchet 154 thereon engageable by a pawl 155 mounted on the arm 156 pivotal on the shaft 151. A link 157 is connected to the free end of the arm 156 and to the free end of an arm 158 pivotally mounted at 159 on a bracket 160 depending from the top wall 145 of the housing 14'. A bracket 161 is mounted on the wall 145 adjacent the right hand end of the screw 142, and a dog 162 is pivotally mounted thereon. As the nut 143 reaches the end of its movement toward the right, the arm 150 engages the dog 162 and pivots this dog toward the right. This pivotal movement of the dog is transmitted through the link 163 to the arm 168 and therefore the arm 158 is moved toward the right against the action of the spring 164 which extends between this arm and the adjacent wall of the housing 14'. Movement of the arm 158 toward the right is transmitted through the link 157 to the arm 156 whereupon the pawl 155 engages a tooth of the ratchet 154 to move the shaft 151. When the nut 143 moves toward the left, the arm 150 disengages the dog 162 and the spring 164 acts to reposition the parts functioning to move the shaft 151.

Drapes 165 and 166 or the like extend along opposite sides of the housing 14' between the screen position and the rear wall thereof and define the display space above the floor 80' where actual articles of merchandise or the like may be displayed. Moreover, these drapes, which may be made of the same material as the curtain 15', conceal the operating mechanisms and the screen when it is moved from display position.

From the foregoing description, it is apparent that by providing a shaft parallel with the shaft imparting movement to the curtain sections, I am enabled to move a screen to and from display position in such a manner that movement of the screen is concealed. Moreover, the screen is moved to and from display position on alternate operations of the device and in this way I am enabled to alternately display a shadow picture, projected onto the screen when it is in display position, and actual articles of merchandise or the like. Moreover, when the device is arranged in the manner illustrated in Figs. 14 to 20, inclusive, the operation of the illuminating means and the projector as well as the advancing of a film through the projector may be controlled by movement of the screen and in this way I am enabled to obtain accurate timing of the device.

It is clear from the foregoing description that I have provided a display device wherein exhibits of a different nature may be alternately displayed. The parts of the device are compactly arranged but nevertheless afford ample display space. The illuminating portions of the device are operated only on alternate operations of the machine to illuminate actual articles of merchandise or the like and are extinguished when a shadow picture is being displayed. Positive operation of the device is assured particularly in view of the fact that a constantly operating drive is provided and the timing of the various devices is effected by parts operated by this constantly operating drive.

While I have illustrated and described selected embodiments of my invention it is to be understood that these are susceptible of variation and modification and I therefore do not wish to be limited to the precise details set forth but desire to avail myself of such changes and alterations as fall within the purview of the following claims:

I claim:

1. In a display device, a housing having an opening at the front end thereof, a curtain including sections movable toward and away from each other in a cycle of operation which includes the open and closed positions thereof, means supporting said curtain sections to prevent sagging thereof during movement and when in closed position, endless reversing screws, and nuts engaging said endless reversing screws and connected to said curtain sections and movable along said screws to move said curtain sections between open and closed positions.

2. In a display device, a housing having an opening at the front thereof, a curtain including sections movable toward and away from each other in a cycle of operation which includes the open and closed positions thereof, means supporting said curtain to prevent sagging thereof during movement and when in closed position, endless reversing screws, nuts engaging said endless reversing screws and connected to said curtain sections and movable along said screws to move said curtain sections between open and closed positions, a screen movable into display position behind said curtain sections, and means for moving said screen to and from display position and operable in timed relation with the movement of said curtain sections.

3. In a display device, a housing having an opening at the front thereof, a curtain including sections movable toward and away from each other in a cycle of operation which includes the open and closed positions thereof, means supporting said curtain to prevent sagging thereof during movement and when in closed position, endless reversing screws, nuts engaging said endless reversing screws and connected to said curtain sections and movable along said screws to move said curtain sections between open and closed positions, a screen movable into display position behind said curtain sections, means for moving said screen to and from display position and operable in timed relation with the movement of said curtain sections, projecting means, and means controlled by said screen for regulating the operation of said projecting means whereby a picture is projected onto said screen when in display position.

4. In a display device, a housing having an opening at the front end thereof, a curtain movable through a cycle of operation including open and closed positions, a screen in said housing behind said curtain, and means controlled by said curtain for moving said screen to and from display position behind said curtain during predetermined cycles of operation of said curtain.

5. In a display device, a housing having an opening at the front end thereof, a curtain movable through a cycle of operation including open and closed positions, a screen in said housing behind said curtain, means controlled by said curtain for moving said screen to and from display position behind said curtain during predetermined cycles of operation of said curtain, illuminating means, and means for rendering said illuminating means inoperative when said screen is in display position.

6. In a display device, a housing having an opening at the front end thereof, a curtain movable through a cycle of operation including open and closed positions, a screen in said housing behind said curtain and movable between an inoperative and a display position, means securing said screen in inoperative position during predetermined cycles of operation of the curtain, and means controlled by the curtain for regulating movement of the screen to and from display position upon release of said securing means.

7. In a display device, a housing having an opening at the front end thereof, a curtain embodying sections movable relative to each other through a cycle of operation including closed and open positions, a screen in said housing behind said curtain and movable between an inoperative and a display position, means securing said curtain in inoperative position during alternate cycles of operation of said curtain, means operated from one of said curtain sections for moving the securing means to and from securing position, and means controlled by the other of the curtain sections for regulating the movement of said screen to and from display position upon retraction of said securing means.

8. In a display device, a housing having an opening at the front end thereof, a curtain embodying sections movable relative to each other through a cycle of operation including closed and open positions, operating means for each of said curtain sections, a screen in said housing behind said curtain and movable between an inoperative and a display position, means securing said screen in inoperative position, and means operable from the operating means for one of said curtain sections for retracting said securing means during alternate cycles of operation of the curtain.

9. In a display device, a housing having an opening at the front end thereof, a curtain embodying sections movable relative to each other through a cycle of operation including closed and open positions, operating means for each of said curtain sections, a screen in said housing behind said curtain and movable between a display position and an inoperative position from which it tends to move into the display position, and means engageable with the operating means for one of said curtain sections to hold said screen in inoperative position whereby said screen may move into display position upon disengagement of the holding means from said operating means, said operating means engaging said holding means and moving said screen into inoperative position as the operating means moves into the position whereat it cooperates with the holding means to hold the screen in inoperative position.

10. In a display device, a housing having an opening at the front end thereof, a curtain embodying sections movable relative to each other through a cycle of operation including closed and open positions, operating means for each of said curtain sections, a screen in said housing behind said curtain and movable between a display position and an inoperative position from which it tends to move into the display position, means engageable with the operating means for one of said curtain sections to hold said screen in inoperative position whereby said screen may move into display position upon disengagement of the holding means from said operating means, said operating means engaging said holding means and moving said screen into inoperative position as the operating means moves into the position whereat it cooperates with the holding means to hold the screen in inoperative position, and means for retaining said screen in inoperative position during alternate cycles of operation of the curtain notwithstanding release of said holding means.

11. In a display device, a housing having an opening at the front end thereof, a curtain embodying sections movable relative to each other through a cycle of operation including closed and open positions, operating means for each of said curtain sections, a screen in said housing behind said curtain and movable between a display position and an inoperative position from which it tends to move into the display position, means engageable with the operating means for one of said curtain sections to hold said screen in inoperative position whereby said screen may move into display position upon disengagement of the holding means from said operating means, said operating means engaging said holding means and moving said screen into inoperative position as the operating means moves into the position whereat it cooperates with the holding means to hold the screen in inoperative position, means for retaining said screen in inoperative position during alternate cycles of operation of the curtain notwithstanding release of said holding means, and means controlling the operation of the retaining means and operable from the operating means for the other of said curtain sections.

12. In a display device, a housing having an opening at the front end thereof and having an exhibit position adapted to be disclosed through said opening, means for illuminating said exhibit position, a screen movable into position to conceal said exhibit position, a curtain, means repetitiously operating said curtain in a cycle of operation including open and closed positions, and means controlled by said screen for operating said illuminating means.

13. In a display device, a housing having an opening at the front end thereof and having an exhibit position adapted to be disclosed through said opening, a screen movable into position to conceal said exhibit position, a curtain, means for repetitiously operating said curtain in a cycle of operation including open and closed positions, means for projecting a shadow picture or the like onto said screen when in display position, and means controlled by the curtain for controlling operation of the means projecting the shadow picture or the like onto the screen.

14. In a display device, a housing having an opening at the front end thereof and having an exhibit position adapted to be disclosed through said opening, a screen movable into position to conceal said exhibit position, a curtain, means for repetitiously operating said curtain in a cycle of operation including open and closed positions, means for projecting a shadow picture onto said screen when in display position, and means for changing the shadow picture during alternate operations of said curtain.

15. In a display device, a housing having an opening at the front end thereof and having an exhibit position adapted to be disclosed through said opening, a screen movable into position to conceal said exhibit position, a curtain, means for repetitiously operating said curtain in a cycle of operation including open and closed positions, a projector mounted at one side of said housing and directed in a line substantially parallel with said screen, means for deflecting a picture projected by said projecting means onto said screen, and means regulated by the position of said screen for controlling the operation of said projecting means.

16. In a display device, a housing having an opening at the front end thereof and having an exhibit position adapted to be disclosed through said opening, a screen movable into position to conceal said exhibit position, a curtain, means for repetitiously operating said curtain in a cycle of operation including open and closed positions, a projector mounted at one side of said housing and directed in a line substantially parallel with said screen, means for deflecting a picture projected by said projecting means onto said screen, means regulated by the position of said screen for controlling the operation of said projecting means, a film carrying pictures adapted to be projected by said projecting means, and means for advancing said film in a step-by-step manner in timed relation with the movement of said screen.

17. In a display device, a housing having an opening at the front end thereof and having an exhibit position adapted to be disclosed through said opening, a screen movable into position to conceal said exhibit position, a curtain, means for repetitiously operating said curtain in a cycle of operation including open and closed positions, a projector mounted at one side of said housing and directed in a line substantially parallel with said screen, means for deflecting a picture projected by said projecting means onto said screen, means regulated by the position of said screen for controlling the operation of said projecting means, a film carrying pictures adapted to be projected by said projecting means, and means operable with said curtain sections for advancing said film in a step-by-step manner in alternate cycles of operation of said curtain.

18. In a display device, a housing having an opening at the front thereof, a curtain including sections movable toward and away from each other in a cycle of operation which includes the open and closed positions thereof, endless reversing screws, nuts engaging said endless reversing screws and connected to said curtain sections and movable along said screws to move said curtain sections between said open and closed positions, a screen in said housing and movable between a display position and an inoperative position from which it tends to move into the display position, and operating means connected to said screen and including a part engageable with one of said nuts to be operated thereby to control movement of said screen between said display and inoperative positions.

19. In a display device, a housing having an opening at the front thereof, a curtain including sections movable toward and away from each other in a cycle of operation which includes the open and closed positions thereof, endless reversing screws, nuts engaging said endless reversing screws and connected to said curtain sections and movable along said screws to move said curtain sections between said open and closed positions, a screen in said housing and movable between a display position and an inoperative position from which it tends to move into the display position, a lever engageable with one of said nuts, means connecting said lever to said screen whereby when said lever is engaged with said nut said screen is caused to move between said display and inoperative positions or held in said inoperative position.

20. In a displaf device, a housing having an opening at the front thereof, a curtain including sections movable toward and away from each other in a cycle of operation which includes the open and closed positions thereof, endless reversing screws, nuts engaging said endless reversing screws and connected to said curtain sections and movable along said screws to move said curtain sections between said open and closed positions, a screen in said housing and movable between a display position and an inoperative position from which it tends to move into the display position, and means for securing said screens in inoperative position.

21. In a display device, a housing having an opening at the front thereof, a curtain including sections movable toward and away from each other in a cycle of operation which includes the open and closed positions thereof, endless reversing screws, nuts engaging said endless reversing screws and connected to said curtain sections and movable along said screws to move said curtain sections between said open and closed portions, a screen in said housing and movable between a display position and an inoperative position from which it tends to move into the display position, means for securing said screen in inoperative position, and means engageable with the other of said nuts to be operated thereby and including parts adapted to retract said securing means on alternate operations of said curtain whereby said screen only moves into display position upon alternate operations of said curtain.

22. In a display device, a housing having an opening at the front thereof, a curtain including sections movable toward and away from each other in a cycle of operation which includes the open and closed positions thereof, endless reversing screws, nuts engaging said endless reversing screws and connected to said curtain sections and movable along said screws to move said curtain sections between said open and closed positions, a screen in said housing and movable between a display position and an inoperative position from which it tends to move into the display position, operating means connected to said screen and including a part engageable with one of said nuts to be operated thereby to control movement of said screen between said display and inoperative positions, illuminating means for said display device, and a switch operated by said screen for controlling the operation of said illuminating means.

23. In a display device, a housing having an opening at the front thereof, a curtain including sections movable toward and away from each other in a cycle of operation which includes the open and closed positions thereof, endless reversing screws, nuts engaging said endless reversing screws and connected to said curtain sections and movable along said screws to move said curtain sections between said open and closed positions, a screen in said housing and movable between a display position and an inoperative position from which it tends to move into the display position, operating means connected to said screen and including a part engageable with one of said nuts to be operated thereby to control movement of said screen between said display and inoperative positions, normally operative illuminating means for said display device, and means operated by said screen when in display position for rendering said illuminating means inoperative.

24. In a display device, a housing having an opening at the front end thereof, a curtain operable in a cycle of operation including the open and closed positions thereof, said housing having an exhibit position, a screen movable to and from display position in front of said exhibit position, means for operating said curtain, means for operating said screen, and means for operating the curtain operating means and the screen operating means in timed relation with each other.

25. In a display device, a housing having an opening at the front end thereof, a curtain including sections movable toward and away from each other in a cycle of operation which includes the open and closed positions thereof, said housing having an exhibit position, a screen movable to and from display position in front of said exhibit position, means supporting said screen for sliding movement to and from display position, means for imparting movement to said curtain sections, means for imparting sliding movement to said screen, and means for operating the curtain operating means and the screen operating means in timed relation with each other.

26. In a display device, a housing having an opening at the front end thereof, a curtain including sections movable toward and away from each other in a cycle of operation which includes the open and closed positions thereof, a screen, means supporting said screen for sliding movement to and from display position, means including endless reversing screws and nuts engaged therewith for moving said curtain sections, means including an endless screw for imparting sliding movement to said screen, and means operating said endless screws in timed relation with each other.

27. In a display device, a housing having an opening at the front end thereof, a curtain including sections, the inner edges of said sections being adapted to engage each other substantially medially of said opening, a screen, means for supporting said screen for sliding movement to and from display position, and means for operating said curtain sections and screens whereby one edge of said screen is aligned with the inner edge of one of said curtain sections during a part of the movement of said screen to and from display position and with the inner edge of the other of the curtain sections during the remainder of its movement to or from display position.

28. In a display device, a housing having an opening at the front end thereof, means for moving a curtain to and from closing position, a screen, means for moving said screen to and from display position, means for projecting a picture onto said screen, and means controlled by said screen for controlling the operation of said projecting means whereby a picture is projected toward said screen only when said screen is in display position.

29. In a display device, a housing having an opening at the front end thereof, means for moving a curtain to and from closing position, a screen, means for moving said screen to and from display position, means for projecting a picture onto said screen, and means controlled by said screen for advancing a film through said projecting means whereby different pictures may be projected onto said screen upon successive movements thereof into display position.

30. In a display device, a housing having an opening at the front thereof, a curtain including sections movable toward and away from each other in a cycle of operation which includes the open and closed positions thereof, said sections comprising accordion pleated members, means supporting said accordion pleated members to prevent sagging thereof during movement and when in closed position, and means for moving said curtain sections through a cycle of operation, said cycle of operation including the extended and collapsed arrangements of said accordion pleated members.

31. In a display device, a housing having an opening at the front thereof, a curtain including sections movable toward and away from each other in a cycle of operation which includes the open and closed positions thereof, said sections comprising accordion pleated members, means supporting said accordion pleated members to prevent sagging thereof during movement and when in closed position, and means connected to the adjacent ends of said curtain sections and operable to move said curtain sections through said cycle of operation, said cycle of operation including the extended and collapsed arrangements of said accordion pleated members.

32. In a display device, a housing having an opening at the front thereof, a curtain including sections movable toward and away from each other in a cycle of operation which includes the open and closed positions thereof, means supporting said curtain to prevent sagging thereof during movement and when in closed position, means for moving said curtain through said cycle of operation, a screen movable into display position behind said curtain sections, and means for moving said screen to and from display position and operable in timed relation with the movement of said curtain sections.

RICHARD H. VANSANT.